Nov. 9, 1926.
C. L. RAYFIELD
1,606,599
AUTOMATIC TIME REGULATING THERMOSTAT
Filed Feb. 14, 1924   2 Sheets-Sheet 1
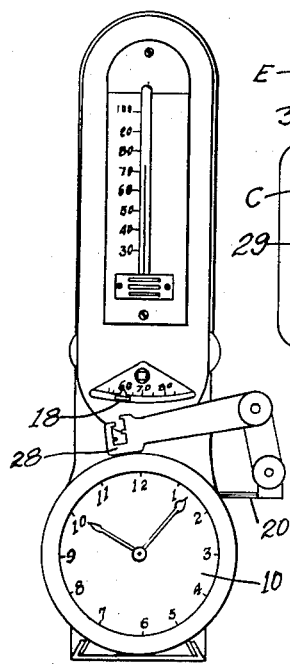
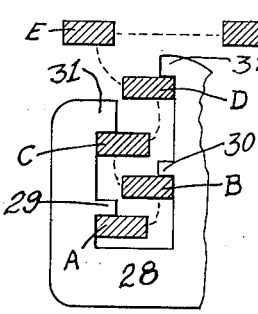
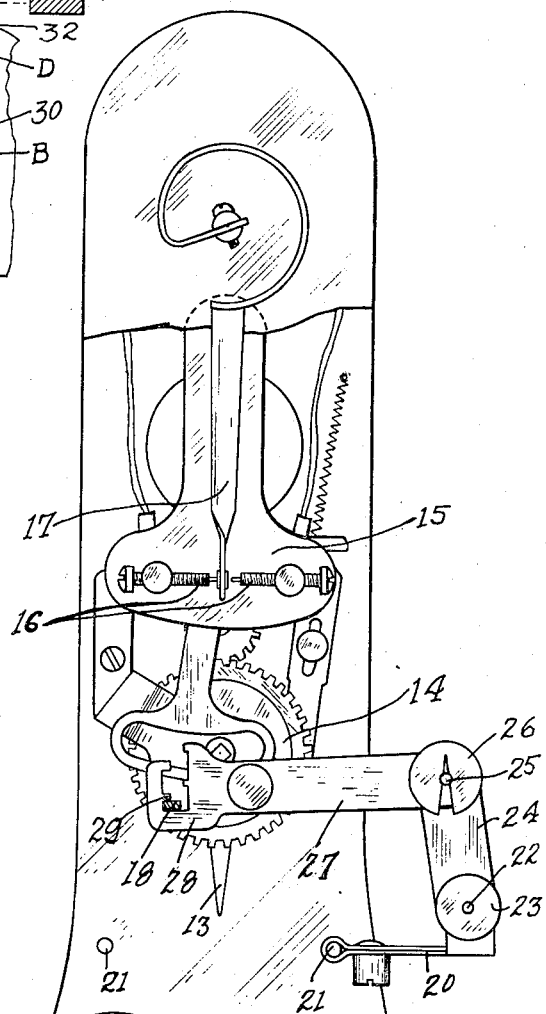
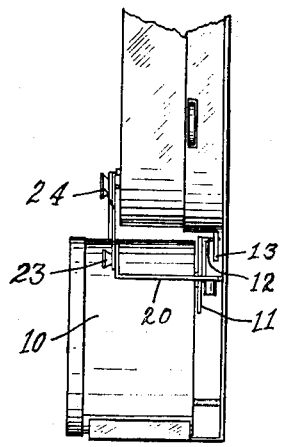
Inventor
Charles L. Rayfield
by Attys.

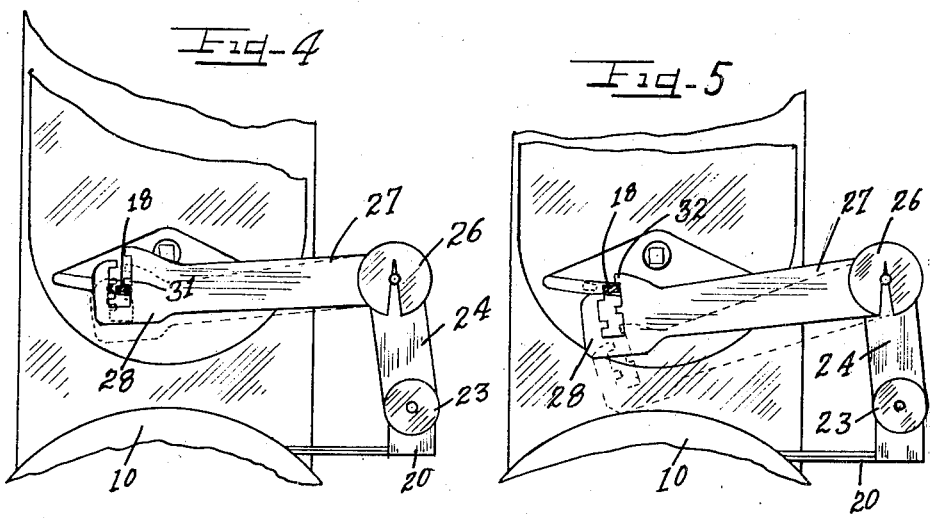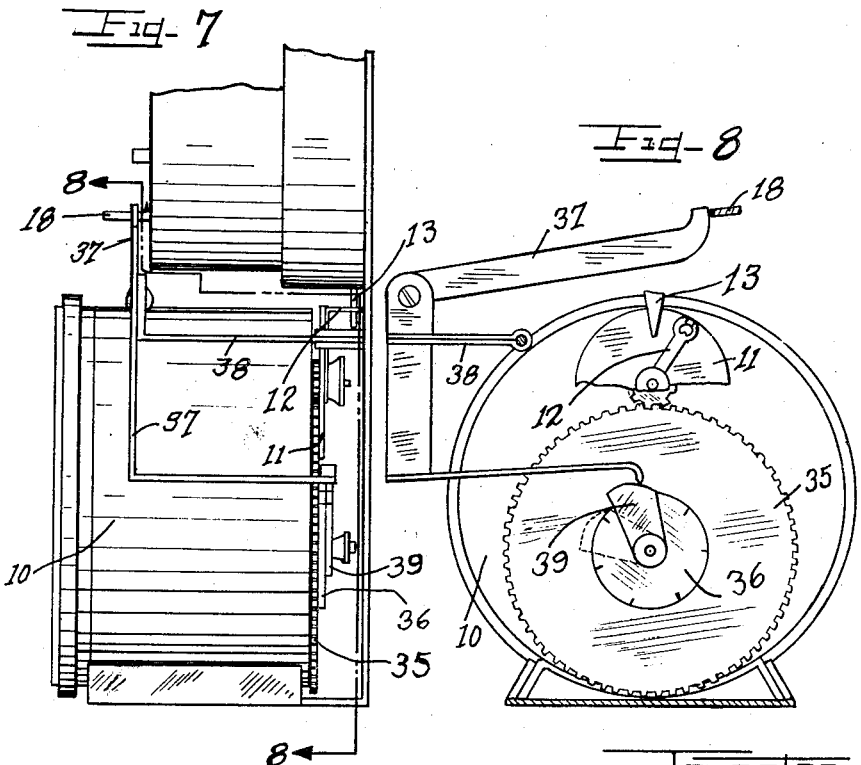

Patented Nov. 9, 1926.

1,606,599

UNITED STATES PATENT OFFICE.

CHARLES L. RAYFIELD, OF CHICAGO, ILLINOIS, ASSIGNOR TO RAYFIELD MANUFACTURING CO., A CORPORATION OF ILLINOIS.

AUTOMATIC TIME-REGULATING THERMOSTAT.

Application filed February 14, 1924. Serial No. 692,630.

This invention relates to an attachment for automatic temperature control thermostats wherein a clock serves to alter the temperature range at given times, as for example lowering the controlling temperature of such a thermostat at a given time at night and restoring the normal controlling temperature at a given time in the morning. Such thermostats are extensively used to control the heating apparatus of homes, apartments, stores and schools where it is economical and desirable to maintain a comfortable temperature during the day and to lower the temperature during the night to save fuel.

It is an object of this invention to provide an attachment for such thermostats adapted to maintain the low or night temperature over one or more of the following days. In schools for example the building is usually unoccupied from Friday afternoon until Monday morning and the provision of a device that will prevent the thermostat from governing the heating apparatus at the higher daytime temperature during the unoccupied period will result in a considerable saving in fuel. With oil burning heating plants such a device is especially desirable because such plants are usually fully automatic in operation and therefore would not require the presence of an attendant or fireman.

It is also an object of this invention to provide a device that can be used at will to delay the normal action of the thermostats for one or more days as the conditions may make desirable.

It is a further object of this invention to provide a device capable of easy attachment to thermostatic regulators even by unskilled persons.

Other and further important objects of this invention will be apparent from the disclosures in the specification and accompanying drawings.

This invention (in a preferred form) is illustrated in the drawings and hereinafter more fully described.

On the drawings:

Figure 1 is a front view of a regulating thermostat having a device embodying features of this invention attached thereto but not operatively engaged with the thermostat mechanism.

Figure 2 is a fragmentary side view of such a thermostat with the attachment applied thereto.

Figure 3 is a partly detailed front view of the thermostat mechanism with the device of this invention applied thereto.

Figures 4 and 5 show successive steps in the operation of the device of this invention, Figure 3 illustrating the initial position, Figure 4 the second position in full lines and the third position in dotted lines, Figure 5 shows the fourth position in full lines and shows the fifth or disconnected position in dotted lines.

Figure 6 illustrates in another way the successive operations of the device.

Figure 7 shows a side view of a thermostat equipped with a modified form of the device of this invention.

Figure 8 is a section on the line 8—8 of Figure 7.

As shown on the drawings:

The device of this invention is shown in connection with a commercial type of clock controlled thermostatic furnace regulator. It is not intended by such a showing to imply that the device of this invention is limited in applicability to the particular make of instrument chosen for illustration as many different manufacturers market instruments to which this device is equally applicable by simple changes in the proportion and arrangement of parts.

The mechanism of the particular thermostat shown comprises a clock 10 having a disc 11 on the back which rotates once in 24 hours and has tripping fingers 12 adjustably secured thereon adapted to engage a trigger 13 at predetermined times. The trigger 13 is adapted to release clockwork 14 which shifts a pivoted plate 15 carrying the contact points 16 alternately engaged by a thermostat 17 thereby altering the temperature range of the thermostat. While comprising no part of this invention it may be stated that high and low temperature electric circuits are provided which actuate auxiliary apparatus controlling the dampers of a coal burning plant or the oil and air supply or pressure of an oil burning apparatus. The trigger and clock mechanism is so arranged as to alternately shift the plate 15 to the right and left, the left position being the low temperature side. A pointer 18 is interconnected with the plate 15 and traverses a graduated scale visible through the instrument cover. This pointer is automatically moved by the thermostat mechanism to indicate the setting thereof and is also manually movable to alter the instrument setting.

With instruments of this type the pointer 18 is shifted to the left by operation of one tripping finger on the disc 11 to shut down the furnace for the night, and the other finger shifts the pointer to the right in the early morning to put on the furnace drafts and restore daytime temperatures.

This action is automatic and repeats itself every day until the clockwork runs down. Of course if the premises are to be unoccupied for a day or two there is a great waste in fuel in heating the building to a comfortable temperature during an unoccupied period as the only heat required even in severe weather is that sufficient to prevent the freezing of water pipes.

The device of this invention comprises a supporting bracket 20 which is clamped to a pin 21 already provided on the thermostat case to properly locate the clock. This bracket is intended to locate the device proper relative to the exposed portion of the pointer 18 with which it is intended to coact. The bracket is provided with a pivot stud 22 and clamping nut 23 to receive an upright link 24 which serves to permit adjustment of the temperature range when the device is in use. A second stud 25 with a split clamping nut 26 is provided about which is freely pivoted a horizontal link 27 which has an escapement jaw 28 adapted to coact with the pointer 18 when desired.

The escapement jaw 28 is shown in detail in Figure 6 wherein the successive positions of the jaw relative to the pointer 18 are represented as though the jaw were stationary whereas as a matter of fact the pointer performs the lateral movements indicated while the pivoted lever carrying the jaw performs the vertical movements with the resulting indicated sequence of movements. For example if the pointer 18 is engaged under the lug 29 in the position indicated by "A" on Friday afternoon the operation of the clock engaging the resetting trigger the following morning moves the pointer to the right out of engagement with the lug 29 and allows the escapement jaw to drop until a lug 30 on the right hand side rests on the pointer which is now in position at "B". The lug 30 is offset vertically relative to the lug 29 to allow horizontal movement of the pointer to the left above the lug 29 but the ends of the lugs are close enough together to prevent direct vertical movement of the jaw. Pursuing the example chosen, Saturday evening the clock will trip the trigger to move the pointer to the low temperature range when the pointer will escape from the lug 30 coming to rest in the position indicated at "C" under a lug 31 forming the left hand terminus of the escapement jaw. A lug 32 bears the same relation to the lug 31 as exists between the lugs 30 and 29, the lug 32 serving as the right hand terminus of the jaw. Sunday morning when the clock trips the trigger mechanism to shift the pointer to the high temperature side, the pointer will engage under the lug 32 at the position indicated by "D". The next movement to the low temperature side will result in entirely releasing the pointer from the escapement jaw which drops out of the way. The following morning the thermostat mechanism operates in the normal manner to move the pointer to the high temperature side as represented by the letter "F".

It will be apparent that the omission of the lug 32 on the right hand side will cut down the period of engagement between the pointer 18 and the jaw by a full day. This would be particularly suitable for buildings occupied by stores and the like which are only vacant for one full day. The same result would be obtained by initially engaging the pointer under the lug 31 in the position indicated at "C." By reversing the vertical position of the right and left hand lugs the device can be used to maintain a sustained high temperature over a like period for such purposes for example as forcing plants in greenhouses.

A modified form of this invention is shown in Figures 7 and 8 wherein reduction gearing 35 is attached to the back of the clock and driven by the clock mechanism through the shaft carrying the disc 11. The large driven gear carries a cam plate 36 which has a hump or cam corresponding in shape with the auxiliary cam 39. The cam serves to lift a lever 37 pivoted to the bracket 38, the lever 37 being moved into a position to intercept the thermostatic pointer and prevent its movement to the high temperature side. In use the gearing is arranged so that the large gear revolves once for the major cycle desired, for example, one revolution per week when the heat is to be cut down over the week end. When the cam lifts the lever 37 it prevents movement of the pointer 18 to the high temperature side on a predetermined morning. Then at night the pointer is free to return to the extreme low temperature setting, and the following morning the cam has moved far enough to let the lever 37 drop out of the way, permitting normal operation of the thermostat. If it is desired to prolong the period of low temperature over another day, the auxiliary cam 39 is moved to the dotted position in Figure 8 where the lever 37 will be held up to block movement of the pointer 18 on the second morning.

I am aware that numerous details of construction may be varied through a wide range without departing from the principles of this invention, and I therefore do not purpose limiting the patent granted otherwise than necessitated by the prior art.

I claim as my invention:

1. In combination with a thermostatic control for heating plants having means for periodically adjusting the desired temperature to be maintained, escapement means engaging said periodically adjusting means to automatically delay the action of the adjusting means over several cycles.

2. In combination with a thermostatic control for heating plants having means for periodically adjusting the desired temperature to be maintained, means for retarding the action of said first mentioned means over one or more days at the will of the operator.

3. An attachment for automatic thermostatic furnace control mechanism comprising a pivoted lever, an escapement jaw thereon adapted to engage with the thermostatic mechanism to restrain the normal operation thereof over a period of several cycles.

4. An automatic device adapted to maintain the low temperature range of a thermostat having a mechanism for automatically shifting from high to low temperature and the reverse at predetermined intervals, comprising an escapement mechanism engaging the shifting mechanism of the thermostat to prevent the normal operation of the shifting mechanism for a predetermined number of shifts.

5. In combination with a thermostat having high and low temperature control ranges, means for temporarily preventing a shift from one temperature range to the other.

6. In combination with mechanism for producing a recurring cycle at predetermined intervals, of means adapted to selectively suppress one or more of said cycles.

7. In combination with control mechanism adapted at predetermined times to actuate another mechanism, of means adapted to restrain said second mentioned mechanism for an arbitrary period.

In testimony whereof I have hereunto subscribed my name.

CHARLES L. RAYFIELD.